(12) United States Patent
Sridhar et al.

(10) Patent No.: US 7,382,781 B1
(45) Date of Patent: Jun. 3, 2008

(54) MULTICAST ARCHITECTURE FOR A VIRTUAL PRIVATE LOCAL AREA NETWORK SERVICE IN A METRO ETHERNET NETWORK

(75) Inventors: Kamakshi Sridhar, Plano, TX (US); Maher Ali, Richardson, TX (US)

(73) Assignee: Alcatel-Lucent, Paris (FR)

( * ) Notice: Subject to any disclaimer, the term of this patent is extended or adjusted under 35 U.S.C. 154(b) by 831 days.

(21) Appl. No.: 10/720,897

(22) Filed: Nov. 21, 2003

(51) Int. Cl.
 *H04L 12/56* (2006.01)
(52) U.S. Cl. .................................. 370/395.21
(58) Field of Classification Search ............ None
See application file for complete search history.

(56) References Cited

U.S. PATENT DOCUMENTS

| 6,515,991 | B1 | 2/2003 | McKeown | |
|---|---|---|---|---|
| 6,516,417 | B1 | 2/2003 | Pegrum et al. | |
| 7,136,374 | B1 * | 11/2006 | Kompella | 370/352 |
| 7,152,115 | B2 * | 12/2006 | Ould Brahim et al. | 709/238 |
| 2004/0037279 | A1 * | 2/2004 | Zelig et al. | 370/390 |

OTHER PUBLICATIONS

Yazdani et al, An MPLS Broadcast Mechanism and Its Extension for Dense-Mode Multicast Support, Springer-Verlag Berlin, pp. 232-242, 2003.*

Rosen, et al.; Multicast in MPLS/BGP VPNs; IETF Network Working Group; Internet Draft; Aug. 2002; pp. 1-18.

Kompella, et al.; Decoupled Virtual Private LAN Services; IETF PPVPN Working Group; Internet Draft; Dec. 2002; pp. 1-16.

Ali Sajassi, Hussein Salama; VPLS based on IP Multicast; PPVPN Working Group, Internet Draft, Expiration May 2003; Nov. 2002, pp. 1-14.

K.Kompella, Y.Rekhter, V.Kompella, J.Achirica, L.Andersson, G.Heron, S.Khandekar, M.Lasserre, P.Lin, P.Menezes, A.Moranganti, H.Ould-Brahim, S.Yeong-Il; Virtual Private LAN Service; Network Working Group Internet Draft; Expires Nov. 2003;May 2003; pp. 1-17.

* cited by examiner

*Primary Examiner*—Frank Duong

(57) ABSTRACT

A centralized node (CM) for coupling into a computer network (10) along which network traffic flows between a plurality of nodes ($PE_x$) in a form of packets. The centralized node is programmed to perform the step of identifying requirements of unicast packet traffic (10, FIG. 1a) along the network, where the unicast packet traffic identifies a first traffic configuration along the network. The centralized node is also programmed to perform the step of constructing a second traffic configuration (10, FIG. 1b) along the network, differing from the first traffic configuration, wherein the second traffic configuration is for routing multicast packet traffic along the network.

20 Claims, 3 Drawing Sheets

MULTICAST ARCHITECTURE FOR A VIRTUAL PRIVATE LOCAL AREA NETWORK SERVICE IN A METRO ETHERNET NETWORK

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a multicast architecture for a virtual private local area network service in a metro Ethernet network.

Ethernet networks have found favor in many applications in the networking industry for various reasons. For example, Ethernet is a widely used and cost effective medium, with numerous interfaces and capable of communications and various speeds up to the Gbps range. Ethernet networks may be used to form a Metro Ethernet Network ("MEN"), which is generally a publicly accessible network that provides a Metro domain, typically under the control of a single administrator, such as an Internet Service Provider ("ISP"). A MEN is typically used to connect between an access network and a core network. The access network typically includes private or end users making connectivity to the network. The core network is used to connect to other Metro Ethernet Networks, and the core network provides primarily a packet switching function.

A MEN typically consists of a number of Provider Edge ("PE") nodes that are statically identified and configured for communicating with one another prior to the communication of packet traffic. The static plan connects the nodes in a point-to-point manner, that is, each PE node is connected to another PE node in an emulated and bi-directional virtual circuit manner, where each such connection is achieved by a Label Switched Path ("LSP"). An LSP is sometimes informally referred to as a link. Thus, each PE node may communicate to, and receive packets from, an adjacent PE node. Further, along each LSP, between adjacent PE nodes, are often a number of Provider ("P") nodes. The P nodes maintain no state information and serve primarily a routing function and, thus, are understood not to disturb the point-to-point connection between the PE nodes of the MEN, which are more intelligent devices. A different number of P nodes may be connected in one communication direction between two adjacent PE nodes as compared to the reverse communication direction between those same two adjacent PE nodes. Lastly, note that a PE node in the MEN is also often connected to one or more Customer Edge ("CE") nodes, where those CE nodes thereby represent the interface between the MEN and an adjacent access network.

With the development of the MEN architecture, there have further evolved additional topologies associated with such a network. One example, that pertains to the preferred embodiments that are later described, is the virtual private local area network service ("VPLS"). A VPLS creates an emulated local area network ("LAN") segment for a given set of nodes in a MEN. The VPLS delivers an ISO layer 2 broadcast domain that is fully capable of learning and forwarding on Ethernet MAC addresses that is closed to a given set of nodes. Thus, within the VPLS, packets may be broadcast to all nodes on the VPLS. As a broadcast medium, however, the present inventors have observed a potential drawback occurring with respect to multicast communications. Specifically, consider a fully-meshed VPLS MEN. In such a network, each PE node is bi-directionally connected to every other PE node in the VPLS MEN. As such, any PE node may communicate as a source directly along an LSP to any other PE node as a destination, where that destination PE node may respond along another LSP (albeit through a different set of P nodes) in the reverse direction back to the source PE node. A single communication between two PE nodes in one direction and in this manner is referred to in the art as a unicast communication. Complexity arises, however, when a single PE node endeavors to communicate a packet to more than one destination PE node; such a communication by way of contrast is referred to in the art as a multicast communication. In the present state of the art, multicasting in a VPLS MEN is achieved by sending packet traffic on multiple point-to-point interfaces between PE nodes that are already communicating unicast packet traffic. As such, if a particular LSP is particularly burdened by already-existing unicast traffic, then that same LSP is further burdened by the additional multicast traffic that is then sought to communicate along the same LSP. This may be problematic as one or more LSPs carrying delay-sensitive unicast traffic are then disturbed by the addition of the multicast traffic. Also, certain regions of the MEN may be congested while others are not.

Given the preceding, the preferred embodiments are directed to providing an improved MEN VPLS that more efficiently accommodates both unicast and multicast traffic, as described below.

BRIEF SUMMARY OF THE INVENTION

In the preferred embodiment, there is a centralized node for coupling into a computer network along which network traffic flows between a plurality of nodes in a form of packets. The centralized node is programmed to perform the step of identifying requirements of unicast packet traffic along the network, where the unicast packet traffic identifies a first traffic configuration along the network. The centralized node is also programmed to perform the step of constructing a second traffic configuration along the network, differing from the first traffic configuration, wherein the second traffic configuration is for routing multicast packet traffic along the network.

Other aspects are also described and claimed.

DETAILED DESCRIPTION OF THE INVENTION

Figure 1A:
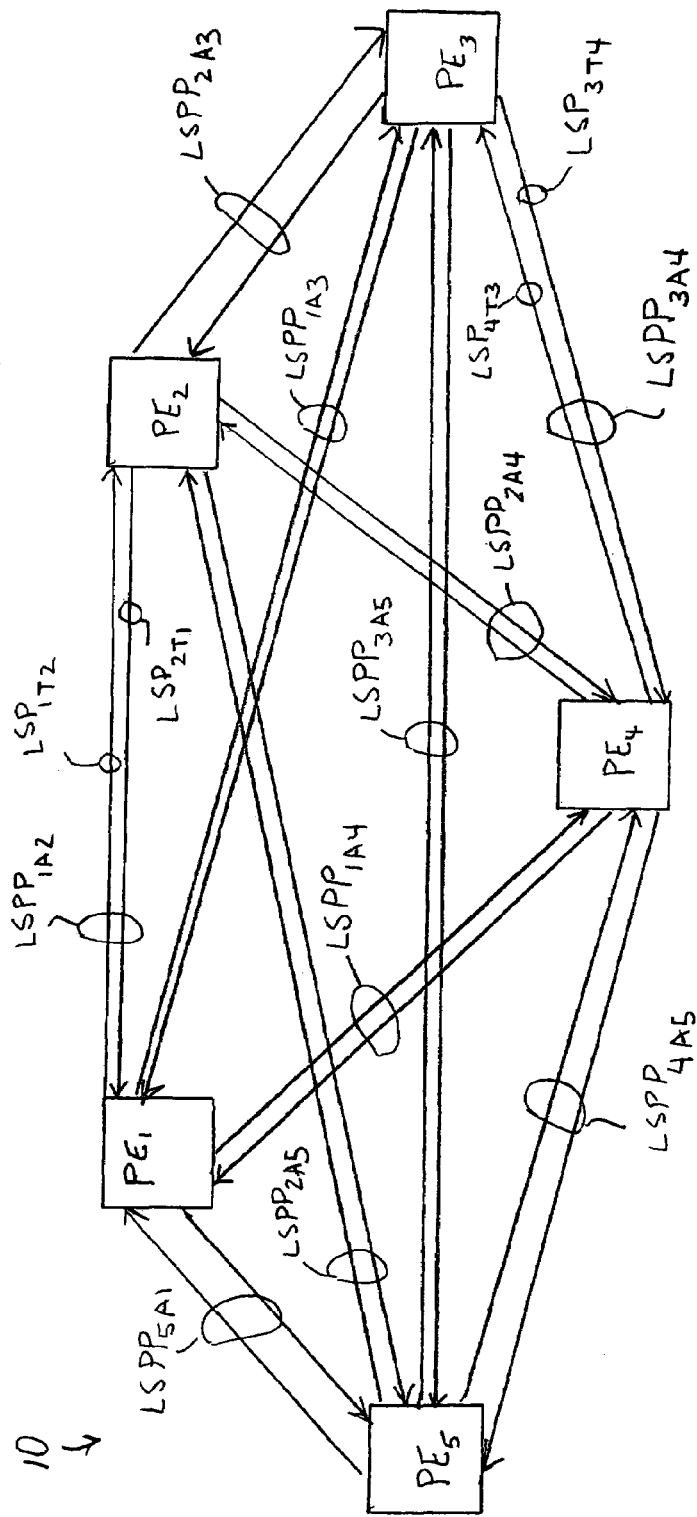
FIG. 1a illustrates a network system according to the preferred embodiment and with respect to the flow of unicast traffic.

By way of illustration of one preferred inventive implementation, FIG. 1a depicts a network system designated generally at 10. Network system 10, in the preferred embodiments, is a Metro Ethernet Network ("MEN") that provides a virtual private local area network service ("VPLS"). System 10 as shown in FIG. 1a illustrates such a network as is known in the art, where the illustration is included to introduce various concepts and conventions and also because it is further improved upon as detailed later in connection with additional figures.

By way of example, system 10 includes five Provider Edge ("PE") nodes $PE_1$, $PE_2$, $PE_3$, $PE_4$, and $PE_5$, where the choice of five is only as an illustration and one skilled in the art should appreciate that any number of such nodes may be included. Indeed, note that often a MEN will include considerably more than five PE nodes. Each PE node may be constructed as a processing device by one skilled in the art using various hardware, software, and programming so as to perform the functionality described in this document. Note that the illustrated PE nodes may represent a single group or multiple groups of nodes, where each group is associated with a certain type of multicast. For example, consider the case of a large business with needs for video streaming data to different nodes in that business; in such a case, one group of the business may have a desire to receive video streaming related to human resource issues, while another group of the business may have a desire to receive video streaming related to business financial matters, while still another group may have a desire to receive video streaming related to marketing issues. Thus, in this case, each group is separately identifiable from the other, and in the preferred embodiment a different multicast routing configuration is established for each such group. Of course, it also should be recognized that a PE node may belong to more than one group, such as a user that desires access to all three types of issues indicated in the present example. In this case, therefore, such a user is associated with three different multicast routing configurations, as also appreciated in additional detail later. Further, as a MEN system, while not shown but as also mentioned earlier in the Background Of The Invention section of this document, it should be understood that between adjacent PE nodes there may be located a number of Provider ("P") nodes.

In system 10, preferably the network is fully meshed, that is, each PE node $PE_x$ is connected to every other PE node in the system, where each connection is by way of a respective Label Switched Path ("LSP") illustrated with an arrow. For sake of reference in this document, the bi-directional connection between two nodes is by way of an LSP pair ("LSPP") that includes one LSP for communications in one direction from a first PE node to a second node and another LSP for communications in the opposite direction, that is, from the second PE node to the first PE node. As an example, PE node $PE_1$ is connected, via four respective LSPPs, to each of PE nodes $PE_2$, $PE_3$, $PE_4$, and $PE_5$. Also, for sake of convention, the label used for each LSPP in FIG. 1a (and FIG. 1b) identifies the two PE nodes between which the LSPP is connected. For example, between PE nodes $PE_1$ and $PE_2$ is an $LSPP_{1,2}$; as another example, between PE nodes $PE_3$ and $PE_4$ is an $LSPP_{3,4}$. Also, for sake of convention, each LSP in an LSPP is designated as $LSP_{x,Ty}$, where x is the source PE node and y is the destination PE node for a given LSP. To simplify FIG. 1a (and FIG. 1b), only a few of these LSPs are so labeled in FIG. 1a. Thus, by way of example, in $LSPP_{1,2}$ between PE nodes $PE_1$ and $PE_2$, PE node $PE_1$ may communicate to PE node $PE_2$ by $LSP_{1T2}$ and PE node $PE_2$ may communicate to PE node $PE_1$ by $LSP_{2T1}$. According to the preferred embodiment, the various LSPs of system 10 in FIG. 1a define the point-to-point interfaces along which unicast traffic is allowed to pass. Thus, for the fully-meshed configuration of system 10, any PE node in that system may communicate directly to any other PE node, that is, with that communication not being required to pass through one or more intermediate PE nodes. For example, PE node $PE_1$ may communicate unicast packets to PE node $PE_2$ along $LSP_{1,42}$. Other examples are readily apparent from the illustrated LSPs in FIG. 1a.

FIG. 1b again illustrates system 10 of FIG. 1a, but the illustration of FIG. 1b is intended to depict issues directed to certain inventive aspects and pertain to multicast communications in system 10. Further, as appreciated through the remainder of this document, these aspects preferably are combined with the illustration of FIG. 1a whereby system 10 per FIG. 1a routes unicast communications in a first overall routing configuration such as in a point-to-point manner in a fully-meshed configuration, whereas system 10 per FIG. 1b routes multicast communications in a second overall routing configuration that differs at least in part from the first overall configuration, and for sake of distinction the multicast LSPs are shown with illustrated with dashed arrows. Various details are provided later as to the development of the second, or multicast, configuration.

Figure 1B:
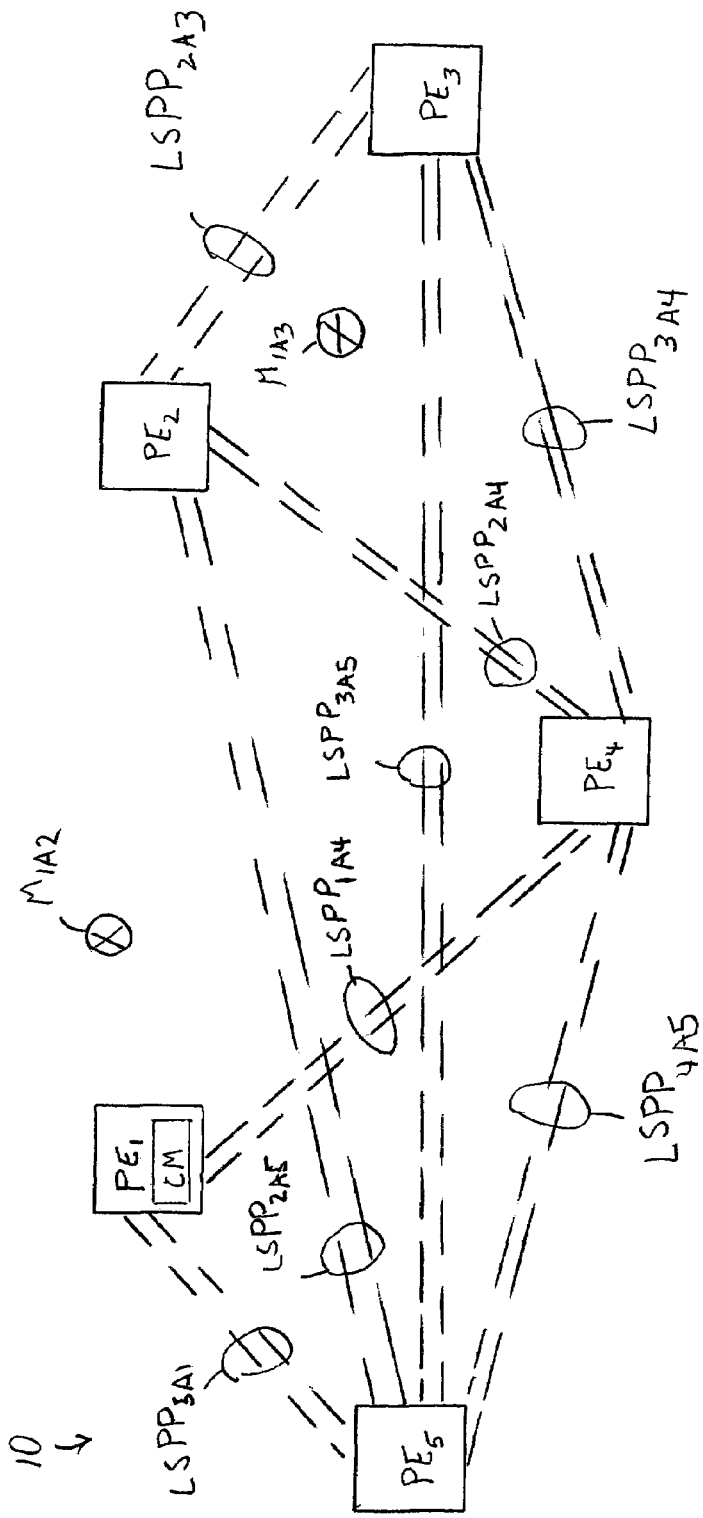
FIG. 1b illustrates the network system of FIG. 1a and according to the preferred embodiment with respect to the flow of multicast traffic.

Looking to system 10 illustrated by FIG. 1b and how it differs in a first respect from FIG. 1a, note that PE node $PE_1$ as illustrated includes a block depicting a central manager CM. In the preferred embodiment, central manager CM is intended to be the overall function that develops the multicast communications configuration in system 10. This function may be included in one of the PE nodes such as illustrated in FIG. 1b in PE node $PE_1$, or alternatively a central manager CM may be a separate node that is not one of the PE nodes in the network. In either case, central manager CM represents a processing device with sufficient knowledge of the state of the network to which it is coupled so as to provide the remaining function described herein. The actual hardware, software, and programming to achieve such a device is readily ascertainable by one skilled in the art given the functional description in this document.

Another difference of system 10 as illustrated in FIG. 1b versus FIG. 1a is that FIG. 1b is intended to illustrate the second overall routing configuration, that is, the configuration that applies to multicast communications (as opposed to unicast communications that are routed according to the illustration of FIG. 1a). Specifically, in the preferred embodiment, central manager CM develops the second overall routing configuration based on various considerations as detailed below. As also detailed later, the second routing configuration preferably is maintained by communication of a different routing table from central manager CM to each of the PE nodes of the applicable network, where thereafter each such PE node routes multicast packets according to its respective table. Before detailing these aspects, note that FIG. 1b illustrates an instance where the second overall routing configuration includes all of the LSPs of the first overall routing configuration shown in FIG. 1a, with two exceptions. Specifically, in FIG. 1b, $LSP_{1,42}$ and $LSP_{1,43}$ are not included in the second overall routing configuration due to issues relating to attributes of those LSPs as used in the first overall routing configuration of FIG. 1a. For example, the excluded $LSP_{1,42}$ and $LSP_{1,43}$ already be heavily loaded with unicast traffic. To further demonstrate this aspect, FIG. 1b illustrates a circled "X" to depict that each of these LSPs are missing, and those X's are labeled $M_{1,42}$ to indicate the missing $LSP_{1,42}$ and $M_{1,43}$ to indicate the missing $LSP_{1,43}$, respectively. Thus, in FIG. 1b, where a missing LSP exists, the PE nodes are prohibited from communicating multicast packets directly to one another, although those packets may be re-routed along any of the other LSPs illustrated in FIG. 1b, as will be further demonstrated later.

In the preferred embodiment, the second overall routing configuration, which recall routes multicast communications, is constructed by central manager CM by first constructing a single Steiner tree, and thereafter by potentially making exceptions to the Steiner tree construction based on various constraints. Steiner trees are known in the art, as may be appreciated with reference to F. K. Hwang, D. S. Richards, and P. Winter, *The Steiner Tree Problem*, North-Holland, Amsterdam, 1992, which is hereby incorporated herein by reference. During the Steiner tree construction, central manager CM identifies the multicast traffic requirements of each PE node in the group of interest as well as the existing unicast traffic requirements. For example, in one case traffic for a group $G_1$ may be required to be multicast to PE nodes $PE_2$, $PE_3$, and $PE_4$, whereas traffic for a group $G_2$ is required to be multicast to PE nodes $PE_3$ and $PE_1$. Further, central manager CM also identifies any LSPs that are overloaded or carry delay sensitive traffic or the like; these LSPs are then excluded or otherwise taken into consideration in the optimized Steiner tree. Further, and by definition, in constructing a Steiner tree, if an LSP in one direction must be avoided, then the reverse direction LSP is also removed from consideration in the determination of the multicast Steiner tree because a Steiner tree cannot be built with any unidirectional communication paths. In other words, a connection between two nodes in a Steiner tree requires bi-directionality and, hence requires both LSPs to form an LSPP. Looking to FIGS. 1a and 1b, therefore, an example of this approach would occur where $LSPP_{1A2}$, or only one of the LSPs $LSP_{1T2}$ or $LSP_{2T1}$ in $LSPP_{1A2}$, is heavily loaded with unicast traffic; as a result, in FIG. 1b, the Steiner tree shown therein does not include $LSPP_{1A2}$, as indicated by the circled X at $M_{1A2}$.

By way of further appreciation to the construction of a Steiner tree, as known in the art, such a tree minimizes a certain cost function for all the nodes that constitute the tree, so in the preferred embodiment this applies to the PE nodes of system 10. Further, the cost function may be selected from various considerations. As an example with respect to a minimized cost function in the preferred embodiment, a Steiner tree may minimize the number of hops. In this case, the tree will minimize the total physical bandwidth used, where physical bandwidth is defined as the number of hops between PE nodes times the bandwidth required per each LSP path covered by a hop. Note, however, that each unidirectional LSP that forms the LSPP between two PE nodes may have a different "cost." Since no known heuristic exists to build a Steiner tree with a node-to-node connection having different costs in each direction, the preferred embodiment when constructing an LSPP between these nodes optimizes the cost that is the maximum of the two different costs of the two LSPs that form the LSPP. Thus, for the example where cost is represented by physical bandwidth, then the larger physical bandwidth along one of the two LSPs that form an LSPP is used to construct the Steiner tree LSPP.

From the preceding, in an ideal example, the preferred embodiment central manager CM constructs the second overall routing configuration with a single Steiner tree; however, the present inventors recognize that often constraints arise that prohibit this ideal scenario. In this case, the Steiner tree is modified based on the constraints. For example, it may not be possible to construct one multicast Steiner tree, for all PE nodes in a desired group, to simultaneously accommodate multicast traffic coming from all the sources within the group at the same time. In other words, there may be one or more PE nodes that have bandwidth requirements that cannot be met by the resulting Steiner tree. According to the preferred embodiment, if a single multicast Steiner tree is not fully supportive of the group's demands, then the multicast Steiner tree is modified by supplementing its configuration with one or more source based trees for those PE nodes that fail to utilize the Steiner tree. Source based trees are also known in the art, as may be appreciated with reference to S. Deering, D. Estrin, D. Farinacci, V. Jacobsen, C. G. Liu, and L. Wei, *The PIM architecture for wide-area multicast routing*, IEEE/ACM Transactions on Networking, 4(2):153-162, April 1996, which is hereby incorporated herein by reference. As its name suggests, a source based tree provides for a next hop indication of a received packet based on the source node of the packet. Thus, in the preferred embodiment, central manager CM also may supplement the Steiner tree by constructing a source based tree, using a minimum heuristic, and using the remaining links that are not included in the Steiner tree and that have available bandwidth. The addition of a source based tree also may accommodate a single LSP that was eliminated as one of two LSPs in an LSPP during the Steiner tree construction; in other words, recall from above that a Steiner tree requires bi-directionally and, thus, during the Steiner tree construction, if a single LSP is identified as to be excluded from multicast communications, then its paired other LSP is likewise excluded. However, when the preferred embodiment supplements the previously-constructed Steiner tree with a source based tree to provide the ultimate second overall routing configuration, then singular LSPs may be included in that configuration. Lastly, note that if bandwidth requirements are still unsatisfied once a single source based tree is constructed, then one or more additional source tress are further constructed by central manager CM until those requirement are met.

The preferred embodiments thus recognize that in a given implementation there are trade-offs between the more optimal approach of a single Steiner tree construction for the multicast traffic versus supplementing that Steiner tree with one or more source based trees. In the former, less state information is required to be stored at each PE node, where that information is then available to central manager CM so that it may construct the Steiner tree. Further, as is known, the Steiner tree by definition provides a more optimal routing configuration than a source based tree. However, a source based tree accommodates constraints for which a known heuristic is not available with a Steiner tree.

Once central manager CM develops the second overall routing configuration, which includes at least a Steiner tree and possibly one or more source based trees, that tree information is communicated in relevant part to each PE node $PE_x$ in system 10. In the preferred embodiment, this routing information that describes the multicast tree is sent to each PE node in a group, or to the entire network 10, via one of any known ascertainable signaling mechanisms. More particularly, for each recipient PE node, central manager CM sends to the node a table that is specific to that PE node based on its connectivity within the second routing configuration and, thus, different from the tables sent to each of the other nodes by central manager CM. For sake of reference in this document, such a table is referred to as a mRoute table. Thus, the mRoute table is particularized to each specific PE node based on where that node is located within the multicast tree(s). More particularly, the mRoute table indicates the next hop for a packet received by the specific PE node. Thus, as now explored by way of example in connection with the following Table 1, assume that it represents the mRoute table transmitted by central manager CM to PE node $PE_1$.

TABLE 1

| Group (or Group/source) | Next PE node |
|---|---|
| $G_1$ | $PE_5$ |
| $G_2$ | $PE_2, PE_3$ |
| $G_3$ | None (final destination) |
| — | — |
| $G_1, PE_2$ | $PE_4$ |
| $G_1, PE_3$ | $PE_2$ |

Looking now to various matters demonstrated by the mRoute table of Table 1, for sake of illustration a dashed line is included after the first three routing entries. The entries above the dashed line in the mRoute table are intended to illustrate those that were identified by central manager CM when constructing a Steiner tree, and the entries below the dashed line are intended to illustrate those that were identified by central manager CM when constructing one or more source based trees. Table 1 also demonstrates the information for a total of three different groups, indicated as $G_1$, $G_2$, and $G_3$. Consider now some multicasting routing examples according to the preferred embodiment and in response to the mRoute table. As a first example, assume that PE node $PE_1$ receives a multicast packet for group $G_1$. As an aside, note that in the current state of the art, there is no group identifier in an Ethernet packet, but rather, the mapping between source/destination and group resides elsewhere, preferably in each PE node as may be achieved as known in the art. With this information, and per the first routing entry in Table 1, PE node $PE_1$ transmits the packet to PE node $PE_5$. As a second example, assume that PE node $PE_1$ receives a multicast packet for group $G_2$. In this case, and per the second routing entry in Table 1, PE node $PE_1$ transmits the packet to two PE nodes, namely, $PE_2$ and $PE_3$. Thus, if packet copies need to be sent to multiple PE nodes, then the next hop PE entry in the mRoute table will have multiple entries. As a third example, assume that PE node $PE_1$ receives a multicast packet for group $G_1$, but in this case assume further that the source ingress PE node of the packet is PE node $PE_2$, meaning PE node $PE_2$ is the first PE node of network system 10 to route the packet along that system, so typically that would be the case where PE node $PE_2$ received the packet from an adjacent core or access network. In other words, the packet entered or had ingress into network system 10, from another network (e.g., core or access), through PE node $PE_2$. As a result, even though the subject packet is a group $G_1$ packet which otherwise would be forwarded according to the first entry in Table 1, the combination of source and group is also specified in Table 1 in a source based tree entry (i.e., below the dashed line). In the preferred embodiment, when a source base tree entry is satisfied in such a manner, then the source based entry is used to determine the next hop rather than the general Steiner tree entry; in the present example, therefore, the packet is forwarded by PE node $PE_1$ to PE node $PE_4$.

For those instances where the mRoute table includes routing based on one or more source based trees, it is further recognized in connection with the preferred embodiments that by definition the source ingress PE node address of packets that will be routed by those trees must be discoverable by each PE node having a mRoute table. In this regard, the present state of the art for Ethernet packets and address learning does not provide such information. Thus, according to the preferred embodiments, an additional aspect is to provide a mechanism so as to provide the packet source information to each PE node in case it is needed by that node to route the packet. Further in this regard, it is known in the art for each PE node to perform a process typically referred to as MAC learning, which involves the communication of unicast traffic through network system 10. Generally, MAC learning provides connectivity information to a PE node that receives a packet, where the information identifies the transmitting node that communicated that packet to the PE node; thus, the receiving PE node stores the connectivity information where thereafter the receiving PE node may then communicate back to the transmitting PE node given that the receiving PE node previously stored, or "learned," that it is connected to the transmitting PE node. In the preferred embodiment, this learning methodology is extended so that a table may be created and maintained so as to assist with the use of the source based routes in the mRoute table, as further detailed below.

Figure 2:
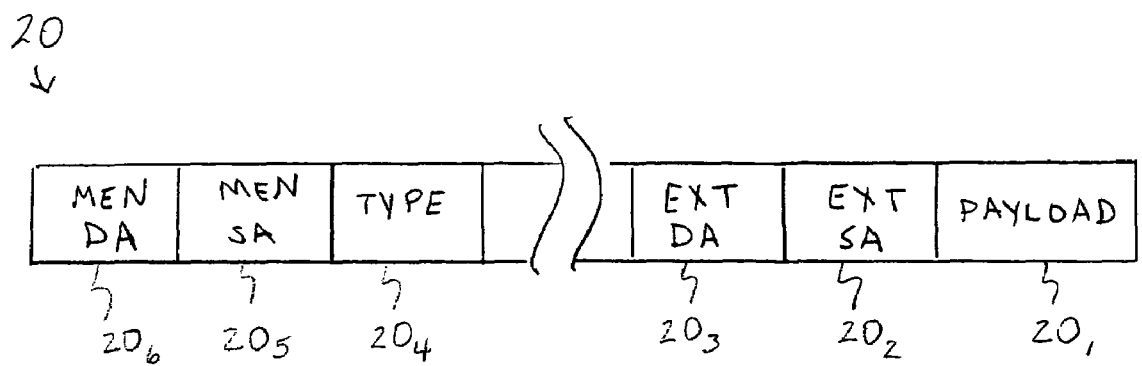
FIG. 2 illustrates a partial structure of an Ethernet packet.

Prior to discussing the additional learning methodology of the preferred embodiments, an understanding of certain aspects of the current state of the art for the format of an Ethernet packet (or "frame") is beneficial. Toward this end, FIG. 2 illustrates a partial structure of a packet 20, where only certain fields of the packet are shown so as to simplify the discussion and focus on various pertinent background. Looking to those fields, they include a payload field $20_1$, which includes the data that is intended for the ultimate recipient node. Adjacent payload field $20_1$ is an external source address field $20_2$ and an external destination address field $20_3$. The term external is used in this document in connection with fields $20_2$ and $20_3$ to indicate that the addresses of those fields are typically external from the MEN that forms system 10. Further, in an Ethernet context, both of these addresses are MAC addresses, so often the address of field $20_2$ is referred to as a source MAC address and the address of field $20_2$ is referred to as a destination MAC address. Also included in packet 20 is a type field $20_4$. The type field specifies the type of packet that packet 20 presents, which may include with particular relevance to the preferred embodiments a unicast type, a multicast type, or a broadcast type. Thus, those packets identified by field $20_4$ as multicast packets may be treated consistent with the teachings in this document. Lastly, packet 20 includes a MEN source address field $20_5$ and a MEN destination address field $20_6$. These latter two addresses are the MAC addresses that apply to each P or PE node as the packet traverses through the MEN system 10. In other words, they are MEN-specific so that, in a given instance when packet 20 is being transmitted by one node P node or PE node in system 10, that node's MAC address is included in the MEN source address field $20_5$, and the destination node to which packet 20 is then being transmitted within MEN system 20 is included in the MEN destination address field $20_6$. Thus, as packet 20 traverses through system 10, these two fields will change with each hop based on the MAC addresses of the node that most recently transmitted the packet and the node to which packet 20 is being transmitted.

Given the preceding, note that as packet 20 is received at system 10 and traverses through that system, there is no field in that packet that identifies the source ingress PE node of the packet, that is, the PE node that first received the packet in system 10 from a node outside of that system. However, in the preferred embodiment, recall that the mRoute table requires knowledge of that source ingress PE node if the packet is to be routed according to a source based tree. Accordingly, also in the preferred embodiment, the unicast learning methodology described above is extended so that an association between MAC addresses external from system 10 are learned and associated with the address of the source ingress PE node that receives a communication from that MAC address. In other words, returning briefly to FIG. 1b, assume that PE node $PE_2$ receives a packet from a device, external from system 10, having a MAC address $MAC_1$. Thus, PE node $PE_2$ stores this information in a table, so that thereafter there is a known association between MAC address $MAC_1$ and PE node $PE_2$. Each other PE node in system 10 operates in the same manner during the learning process and the totality of these types of associations are then distributed to all PE nodes in system 10 of the same type of group. Thus, for a PE node in a given group, its table of this sort may provide the mapping as shown in the following Table 2.

TABLE 2

| External MAC address | Source Ingress PE node |
|---|---|
| $MAC_1$ | $PE_2$ |
| $MAC_2$ | $PE_2$ |
| $MAC_3$ | $PE_4$ |
| $MAC_4$ | $PE_4$ |

With the information in Table 2, and returning briefly to Table 1, one skilled in the art should appreciate how the mapping of the former facilitates routing according to the latter. Particularly, when a PE node receives a packet, and assuming the extended MAC learning associated with Table 2 has been previously performed, then the receiving PE node has knowledge of the MAC address from the source that originated the packet outside of system 10. Thus, if the ingress PE node associated with that MAC address is identified in the one or more source based trees of the mRoute table (e.g., below the dashed line in Table 1) and has a corresponding group indicated in that table, then the packet's next hop is determined from the mRoute table. For example, assume that a PE node using Tables 1 and 2 receives a packet with MAC address $MAC_1$ and that packet is for distributing to group $G_1$. From Table 2, MAC address $MAC_1$ is associated with PE node $PE_2$. Further, per Table 2, a group $G_1$ packet that entered system 10 by way of ingress to PE node $PE_2$ is to be transmitted to PE node $P_4$; thus, the example packet is so transmitted.

From the above illustrations and description, one skilled in the art should appreciate that the preferred embodiments provide a computer network that supports a combined multicast and unicast architecture, which is preferably embodied in a virtual private local area network service in a metro Ethernet network. The preferred embodiments provide various benefits in supporting both unicast and multicast communications. For example, the preferred embodiment allows for optimization of the LSP resources for multicast traffic. As another example, no new LSP(s) is/are needed to accommodate multicast communications beyond those used for unicast communications. As another example, the preferred embodiments provide dynamic, centralized solution. Further, the determination of the multicast tree(s) can be done at periodic intervals, or when there is a new multicast group added to the network. As a final benefit, while the present embodiments have been described in detail, various substitutions, modifications or alterations could be made to the descriptions set forth above without departing from the inventive scope which is defined by the following claims.

The invention claimed is:

1. A centralized node for coupling into a computer network along which network traffic flows between a plurality of nodes in a form of packets, programmed to perform the steps of:
   identifying requirements of unicast packet traffic along the network, wherein the unicast packet traffic identifies a first traffic configuration along the network; and
   constructing a second traffic configuration along the network, differing from the first traffic configuration, wherein the second traffic configuration is for routing multicast packet traffic along the network; and
   communicating routing information representing at least a portion of the second traffic configuration to each node in the plurality of nodes, wherein each node in the plurality of nodes routes multicast packet traffic in response to the at least a portion of the second traffic configuration.

2. The centralized node of claim 1:
   wherein each node in the plurality of nodes comprises a Provider Edge node; and
   wherein for unicast communications each Provider Edge node in the plurality of nodes is coupled to communicate directly with each other Provider Edge node in the plurality of nodes.

3. The centralized node of claim 1:
   wherein the step of constructing a second traffic configuration comprises constructing a Steiner tree along the network; and
   wherein the at least a portion of the second traffic configuration communicated to each node corresponds to the connectivity of the respective node along the Steiner tree.

4. The centralized node of claim 3 wherein the at least a portion of the second traffic configuration indicates, to a receiving node that receives the at least a portion of the second traffic configuration, selected instances during which a received packet is to be communicated to multiple nodes in the plurality of nodes.

5. The centralized node of claim 1 wherein the step of constructing a second traffic configuration comprises minimizing a cost function for all the nodes in the plurality of nodes.

6. The centralized node of claim 1 wherein the step of constructing a second traffic configuration comprises constructing a Steiner tree along the network.

7. The centralized node of claim 1 wherein the centralized node is one node in the plurality of nodes.

8. The centralized node of claim 6 wherein the step of constructing a second traffic configuration further comprises supplementing the Steiner tree along the network by constructing one or more source based trees along the network.

9. The centralized node of claim 1:
   wherein the plurality of nodes comprises more than one group of nodes;
   wherein the step of constructing a second traffic configuration along the network comprises constructing the second traffic configuration for a first group of nodes in the more than one group of nodes; and
   wherein the centralized node is further programmed to perform a step of constructing a different respective second traffic configuration along the network for each group in the more than one group of nodes.

10. The centralized node of claim 9 wherein the step of constructing a different respective second traffic configuration comprises, for each different respective second traffic configuration:
   constructing a Steiner tree along the network; and
   supplementing the Steiner tree along the network by constructing one or more source based trees along the network.

11. A centralized node for coupling into a computer network along which network traffic flows between a plurality of nodes in a form of packets programmed to perform the steps of:
   identifying requirements of unicast packet traffic along the network, wherein the unicast packet traffic identifies a first traffic configuration along the network; and
   constructing a second traffic configuration along the network, differing from the first traffic configuration, wherein the second traffic configuration is for routing multicast packet traffic along the network and wherein the step of constructing a second traffic configuration comprises constructing a Steiner tree along the network and supplementing the Steiner tree along the network by constructing one or more source based trees along the network; and
   communicating table routing information representing at least a portion of the second traffic configuration to each node in the plurality of nodes;
   wherein each node in the plurality of nodes routes multicast packet traffic in response to the table routing information;
   wherein the table routing information comprises Steiner tree entries that indicate a next hop for a received packet by associating a group to which a receiving node belongs with a destination node in the plurality of nodes; and
   wherein the table routing information further comprises source based tree entries that indicate a next hop for a received packet by associating a group to which a receiving node belongs and an ingress node in the plurality of nodes with a destination node in the plurality of nodes.

12. The centralized node of claim 11 wherein each node in the plurality of nodes is programmed to perform a step of identifying an association between the respective node when it is operating as an ingress node and one or more MAC addresses external from the network.

13. The centralized node of claim 11 wherein the table routing information indicates, to a receiving node that receives the table routing information, selected instances during which a received packet is to be communicated to multiple nodes in the plurality of nodes.

14. The centralized node of claim 13 wherein the network comprises a Metro Ethernet network.

15. The centralized node of claim 14 wherein the plurality of nodes comprises a virtual private local area network service.

16. A node for coupling into a computer network along which network traffic flows between a plurality of nodes in a form of packets, wherein the plurality of nodes includes the node for coupling, the node for coupling programmed to perform the steps of:
   communicating unicast packet traffic along the network according to a first traffic configuration along the network; and
   communicating multicast packet traffic along the network according to a second traffic configuration along the network, wherein the second traffic configuration differs from the first traffic configuration; and
   receiving, along the network, table routing information representing at least a portion of the second traffic configuration, wherein the table routing information is responsive to at least a portion of a Steiner tree along the network.

17. The node for coupling of claim 16 wherein the table routing information is further responsive to one or more source based trees along the network.

18. A method of operating a computer network along which network traffic flows between a plurality of nodes in a form of packets, comprising:
   communicating unicast packet traffic along the network according to a first traffic configuration along the network; and
   communicating multicast packet traffic along the network according to a second traffic configuration along the network, wherein the second traffic configuration differs from the first traffic configuration; and
   communicating routing information representing at least a portion of the second traffic configuration to each node in the plurality of nodes, wherein each node in the plurality of nodes routes multicast packet traffic in response to the at least a portion of the second traffic configuration.

19. The method of claim 18 and further comprising constructing the second traffic configuration by the steps of:
   constructing a Steiner tree along the network; and
   supplementing the Steiner tree along the network by constructing one or more source based trees along the network.

20. A centralized node for coupling into a computer network along which network traffic flows between a plurality of nodes in a form of packets programmed to perform the steps of:
   identifying requirements of unicast packet traffic along the network, wherein the unicast packet traffic identifies a first traffic configuration along the network; and
   constructing a second traffic configuration along the network, differing from the first traffic configuration, wherein the second traffic configuration is for routing multicast packet traffic along the network and wherein the step of constructing a second traffic configuration comprises constructing a Steiner tree along the network;
   wherein for unicast communications each node in the plurality of nodes is bi-directionally coupled to each other node in the plurality of nodes by a pair of Label Switched Paths; and
   wherein the step of constructing a Steiner tree comprises optimizing a cost that is selected from a greater of a cost associated with a first Label Switched Path in the pair of Label Switched Paths and a cost associated with a second Label Switched Path in the pair of Label Switched Paths.

* * * * *